(12) United States Patent
Tazartes et al.

(10) Patent No.: US 6,268,922 B1
(45) Date of Patent: *Jul. 31, 2001

(54) METHOD AND APPARATUS FOR DETERMINING FRINGE NUMBER IN A FIBER-OPTIC GYRO

(75) Inventors: Daniel A. Tazartes, West Hills; Howell J. Tipton, Woodland Hills, both of CA (US)

(73) Assignee: Litton Systems, Inc., Woodland Hills, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,892

(22) Filed: Dec. 10, 1998

(51) Int. Cl.$^7$ ................................................. G01C 19/72
(52) U.S. Cl. ................................... 356/460; 356/464
(58) Field of Search ............................... 356/350, 460, 356/463, 464

(56) References Cited

U.S. PATENT DOCUMENTS 4,874,244 * 10/1989 Kersey ................................. 356/350

FOREIGN PATENT DOCUMENTS

402249902A * 10/1990 (JP).

* cited by examiner

Primary Examiner—Samuel A. Turner
(74) Attorney, Agent, or Firm—Robert E. Malm

(57) ABSTRACT

The invention is a method and apparatus for determining the fringe number for a fiber-optic gyro. The fiber-optic gyro comprises a light source feeding an interferometer which in turn feeds a detector. The detector output signal is a function of the fringe number and a plurality of controllable parameters. The method comprises the steps of (1) determining the values of the controllable parameters and (2) extracting the fringe number from the detector output signal utilizing the values of the controllable parameters.

23 Claims, 1 Drawing Sheet

METHOD AND APPARATUS FOR DETERMINING FRINGE NUMBER IN A FIBER-OPTIC GYRO

CROSS-REFERENCE TO RELATED APPLICATIONS (Not applicable)

STATEMENT REGARDING FEDERALLY SPONSORED RESEARCH AND DEVELOPMENT (Not applicable)

BACKGROUND OF THE INVENTION

This invention relates generally to fiber-optic gyros and more specifically to the signal processing associated with fiber-optic gyros.

Fiber-optic gyros measure rate of rotation by determining the phase difference in light waves that propagate in opposite directions through a coil wound with optical fiber. Light waves that propagate through the coil in the direction of rotation take a longer time than light waves that propagate through the coil in the direction opposite to the direction of rotation. This difference in time, measured as the phase difference between counter-propagating light waves, is proportional to the angular velocity of the coil.

A typical block diagram for a fiber-optic gyro is shown in FIG. 1. A light source 2 supplies a reasonably coherent light beam to the optical-fiber interferometer 4 which causes the input light beam to be split into two light beams that are fed into opposite ends of an optical fiber configured as a coil. The light beams emerging from opposite ends of the optical fiber are recombined into a single output light beam that feeds into the detector 6.

The detected light intensity I (i.e. output of the detector 6) is given by $$I = \frac{I_o}{2}[1 + \cos\theta(t)] \tag{1}$$

where $I_o$ is the peak detected light intensity and $\theta(t)$ is the phase difference between the two beams expressed as a function of time.

The phase difference $\theta(t)$ typically takes the form $$\theta(t) = [\Phi(t)]_{mod 2\pi} - [\Phi(t-\tau)]_{mod 2\pi} + \phi_S + 2\pi n \tag{2}$$

where $\Phi(t)$ is the phase-modulation generating function and $\Phi(t)_{mod 2\pi}$ is the phase modulation introduced by a phase modulator within the interferometer 4, $\tau$ is the propagation time through the fiber optic coil, and $(\phi_S + 2\pi n)$ is the so-called Sagnac phase resulting from the rotation of the fiber-optic coil about its axis. The integer n (called the Sagnac fringe number or simply fringe number) is either positive or negative and the Sagnac residual phase $\phi_S$ is constrained to the range $-\pi \leq \phi_S < \pi$.

The output of the detector 6 is high-pass filtered to remove the DC component, then converted to digital form by the analog-to-digital converter 8, and finally processed in the digital processor 10 to yield at the output a measure of the rate and angle of rotation of the interferometer 4. In addition, the digital processor 10 generates a phase-modulation generating function $\Phi(t)$, the modulo-$2\pi$ portion of which is converted to analog form by the digital-to-analog converter 12 and supplied to the phase modulator in the interferometer 4.

The phase-modulation generating function $\Phi(t)$ typically consists of a number of phase-modulation components among which are $\Phi_{SE}(t)$ and $\Phi_M(t)$. The phase-modulation component $\Phi_{SE}(t)$ is typically a stepped waveform with steps that change in height by $-\phi_{SE}$ at $\tau$ intervals where $\phi_{SE}$ is an estimate of $\phi_S$. Thus, the $\Phi_{SE}(t)$ modulation cancels in large part $\phi_S$. The accurate measurement of the uncancelled portion of the Sagnac residual phase $\phi_S$ is of great importance in that it is the quantity that is used in refining the estimate of the Sagnac phase and generating the $\Phi_{SE}(t)$ phase-modulation component.

The accurate measurement of the uncancelled portion of the Sagnac residual phase is greatly facilitated by choosing the $\Phi_M(t)$ phase-modulation component such that $[\Phi_M(t)-\Phi_M(t-\tau)]$ is equal to $j\phi_M$ where the permitted values of j are the values −1 and 1 and $\phi_M$ is a predetermined positive phase angle somewhere in the vicinity of $\pi/2$ radians where the slope of the cosine function is greatest. This effect can be achieved, for example, by having $\Phi_M(t)$ be a square wave with amplitude $\pi/2$ and period $2\tau$.

While it might appear that the best choice for $\phi_M$ would be $\pi/2$ where the slope of the cosine function is greatest, it has been shown that values between $\pi/2$ and $\pi$ provide better noise performance.

The $\Phi_M(t)$ modulation can also be a stepped function wherein the phase increases or decreases at $\tau$ intervals by $\phi_M$. Under these circumstances, $$[\Phi(t)]_{mod 2\pi} - [\Phi(t-\tau)]_{mod 2\pi} = 2\pi k - \phi_{SE} + j\phi_M \tag{3}$$

where k is an integer which maintains the $\Phi_M(t)$ modulation between 0 and $2\pi$.

Substituting these expressions in equation (2), we obtain $$\theta = 2\pi(k+n) + j\phi_M \tag{4}$$

The equation above is the ideal phase difference equation, where $\phi_S - \phi_{SE} = 0$. For fiber-optic closed-loop calculation, two control parameters are inserted into the phase difference equation with the following result:

$$\theta = (2\pi k + j\phi_M)\left(1 + \frac{\delta}{\pi}\right) + \epsilon + 2\pi n \tag{5}$$

The rebalance phase error $\epsilon$ is given by $$\epsilon = \phi_S - \phi_{SE} \tag{6}$$

and the phase modulator scale factor error $\delta/\pi$ is given by $$\frac{\delta}{\pi} = \frac{\phi_X}{X} - 1 \tag{7}$$

where $\phi_X$ is the change in light phase caused by a phase modulation step intended to produce a change of X radians. Note that if $\phi_X$ were correct and equal to X, then $\delta$ would be equal to zero.

The parameters $\phi_{SE}$ and $\phi_X$ (for a particular X) are driven by control loops to force two demodulation signals to zero. The first demodulation signal DMOD1 is given by $$DMOD1 = \sum_{j,k} P_{kj} j\left(I_{kj} - l\frac{I_0}{2}\sin\phi_M\right) \quad (8)$$

and the second demodulation signal DMOD2 is given by $$DMOD2 = \sum_{j,k} P_{kj} D_{kj}\left(I_{kj} - l\frac{I_0}{2}\sin\phi_M\right) \quad (9)$$

where $P_{kj}$ is the probability of occurrence of each state, $D_{kj}$ is the scale factor demodulation polarity, $I_{kj}$ is the amplitude of the signal that results from the high-pass filtering of the output signal from detector 6 which may be a function of k and j, and l is the average of $I_{kj}$ expressed in units of $$\frac{I_0}{2}\sin\phi_M.$$

The DC bias parameter l is driven by a third control loop to force a third demodulation signal to zero. The third demodulation signal DMOD3 is given by $$DMOD3 = \sum_{j,k} P_{kj}\left(I_{kj} - l\frac{I_0}{2}\sin\phi_M\right) \quad (10)$$

Fiber optic gyros generally employ broadband light sources in order to avoid polarization cross-coupling effects as the light propagates through the fiber. As a result, however, coherence is lost as non-reciprocal phase shifts between the clockwise and counter-clockwise beams are introduced. This leads to the "fringe visibility effect" whereby the interference pattern between the two beams loses contrast as the difference in optical paths increases.

In an interferometric fiber-optic gyro (IFOG), a phase shift is generated between counter-propagating beams in proportion to the applied angular rate. The Sagnac scale factor relates the phase shift to the rate. A typical Sagnac scale factor for a gyro used in navigation is 3 to 20 $\mu$rad/(deg/hr). The phase shift between the two beams in an IFOG is used to estimate the angular rate (assuming a calibrated Sagnac scale factor). However, the interferometer operates on a modulo $2\pi$ basis. That is, $\phi+2n\pi$ cannot be distinguished from $\phi$ if n is an integer. For a Sagnac scale factor of 3.5 $\mu$rad/(deg/hr), $2\pi$ radians corresponds to approximately 500 deg/s.

Usually, the IFOG is used in applications where the initial angular rate is close to zero ard then builds up to larger values. As long as the phase shift is continuously tracked from turn-on, the total phase including multiples of $2\pi$ can be estimated to yield actual angular rate. However, in certain applications, the gyro can be powered up in the presence of significant angular rate that will cause the initial condition to be incorrect. For example, if a gyro is powered up at a time it is spanning at 500 deg/s, it will appear that the phase shift is close to zero and the measured rate will be estimated to be near zero.

Up to now there has been no means for establishing the initial multiple of $2\pi$ (i.e. the fringe number) that was captured. The fringe visibility effect, which causes errors in the measurement of gyro phase, provides such a means.

BRIEF SUMMARY OF THE INVENTION

The invention is a method and apparatus for determining the fringe number for a fiber-optic gyro. The fiber-optic gyro comprises a light source feeding an interferometer that in turn feeds a detector. The detector output signal is a function of the fringe number and a plurality of controllable parameters. The method comprises the steps of (1) determining the values of the controllable parameters and (2) extracting the fringe number from the detector output signal utilizing the values of the controllable parameters.

DESCRIPTION OF THE INVENTION

Figure 1:
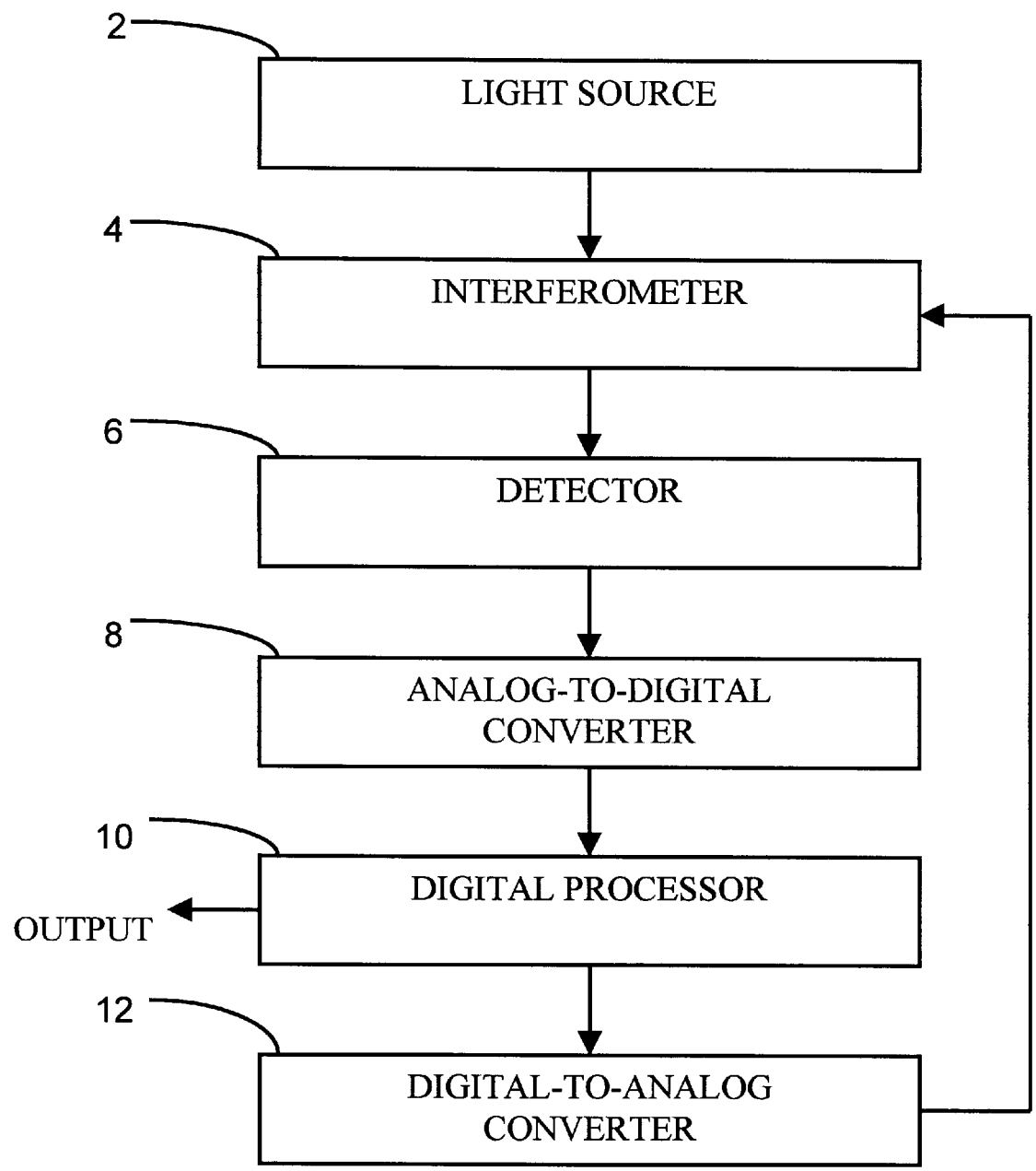
FIG. 1 is a block diagram of a fiber-optic gyro and associated control loop.

The fringe visibility effect in an IFOG results from the loss of interferometer fringe contrast as the interferometer phase grows. For modulation values that are odd multiples of $\pi/2$, the fringe visibility effect vanishes. However, with overmodulation, the fringe visibility effect does cause errors that must be corrected if the greatest possible measurement accuracy is to be achieved.

It can be shown that given a broadband source, equation (1) becomes (ignoring powers of $\theta$-squared greater than one)

$$I = \frac{I_o}{2}[1 + (1 - \alpha\theta^2)\cos\theta] \quad (11)$$

While this equation is an approximation, it holds relatively well for typical fiber-optic gyro sources whose line-widths are on the order of 1% of the wavelength.

With $\phi_M$ equal to an odd-integer multiple of $\pi/2$ radians, the fringe visibility error vanishes because cos $\theta$ equals zero. For other values of $\phi_M$ in a closed-loop fiber-optic gyro operating within the confines of a single fringe ($-\pi \leq \phi_S < \pi$) the effect manifests itself as a bias error that is rate-dependent and normally appears as a simple scale-factor miscalibration. However, for multiple fringe operation (n>1), the effect manifests itself as a bias error which is a function of phase shift within a fringe. Multiple-fringe operation is especially important in gyros with large Sagnac scale factors, the Sagnac scale factor being the ratio of the Sagnac phase to the rotation rate of the fiber-optic gyro.

The error in the detected light intensity I from detector 6 resulting from fringe visibility can be calculated in the following way. Using equations (4) and (11), we can obtain the intensity error due to fringe visibility for a fiber-optic gyro operating with a modulation amplitude $\phi_M$.

$$-\left(\frac{I_0}{2}\alpha\cos\theta\right)\theta^2 = \frac{I_0}{2}\sin\phi_M(Q_{nkj} + Q_{av}) \quad (12)$$

where we have dropped second-order terms. The quantity $Q_{nkj}$ is given by the expression $$Q_{nkj} = S(n+k)(n+k+jr) \quad (13)$$

where $$S = -4\pi^2 \alpha \cot \phi_M \quad (14)$$

and $$r = \frac{\phi_M}{\pi} \quad (15)$$

The symbol $Q_{av}$ denotes the average detected light intensity level shift in units of $$\frac{I_0}{2}\sin\phi_M$$

of the output signal from detector 6 signal prior to the high-pass filtering.

In order to constrain $[\Phi_M(t)]_{mod2\pi}$ to the range from 0 to a value less than $2\pi$, k must satisfy the following relationship:

$$k=h-c \quad (16)$$

where $$h=SGN(-\phi_{SE}+j\phi_M): h=0 \text{ denotes}+; h=1 \text{ denotes}-. \quad (17)$$

$$c=0;\{[\Phi(t-\tau)]_{mod2\pi}+2\pi h-\Phi_{SE}+j\Phi_M\}<2\pi c=1; \quad (18)$$

otherwise
Combining equations (5), (11) and (12), we obtain $$I = \frac{I_0}{2}\sin\phi_M(Q_{nkj}+l) - \frac{I_0}{2}\sin\phi_M\left(2jk\delta+\frac{\phi_M}{\pi}\delta+j\varepsilon\right)+\text{DC intensity} \quad (19)$$

The quantity (I–DC intensity) in equation (19) corresponds to the amplitude of the signal that results from the high-pass filtering of the output signal from detector 6. Denoting the quantity (I–DC intensity) by $I_{nkj}$ we obtain $$I_{nkj} = (Q_{nkj}+l) - \left(2jk\delta+\frac{\phi_M}{\pi}\delta+j\varepsilon\right) \quad (20)$$

where the light intensity $I_{nkj}$ is expressed in units of $$\frac{I_0}{2}\sin\phi_M.$$

The quantity l denotes the average detected light-intensity level shift in units $$\frac{I_0}{2}\sin\phi_M$$

that results from the analog-to-digital conversion process performed by analog-to-digital converter 8. It can be shown that if the gyro loops described by equations (8), (9), and (10) are satisfied, the total detected light intensity will be a function of the modulation point defined by j and k.

The fiber-optic gyro operates in states Z, A, B, C, D, and E which are identified by corresponding (k,j) values. It follows from equation (20):

State Z ($k=1,j=1$): $Z_n=Q_{nkj}-\epsilon-(2+r)\delta+l$

State A ($k=1,j=-1$): $A_n=Q_{nkj}+\epsilon+(2-r)\delta+l$

State B ($k=0,j=1$): $B_n=Q_{nkj}-\epsilon-r\delta+l$

State C ($k=0,j=-1$): $C_n=Q_{nkj}+\epsilon-r\delta+l$

State D ($k=-1,j=1$): $D_n=Q_{nkj}-\epsilon+(2-r)\delta+l$

State E ($k=-1,j=-1$): $E_n=Q_{nkj}+\epsilon-(2+r)\delta+l$ (21)

where we have replaced $I_{nkj}$ in each equation by a symbol identifying the associated state.

The fiber-optic gyro operates in three zones defined as follows:

Zone 1: $-\phi_M \leq \phi_S \leq \phi_M$
Zone 2: $-\pi \leq \phi_S < -\phi_M$
Zone 3: $\phi_M < \phi_S < \pi$ With closed-loop random overmodulation, the gyro can be modulated to any one of four states within the zone of operation. In zone 1, the available states are A, B, C, and D. In zone 2, the available states are B, C, D, and E. In zone 3, the available states are Z, A, B, and C. The probability of occurrence of a given state depends on the actual phase shift of operation.

In a closed-loop IFOG mechanization three control loops operate continuously in order to maintain the gyro control points at the chosen values. The first control loop, in the absence of The fringe visibility effect, maintains a controllable phase $\phi_{SE}$ of the interferometer output light beam equal to the Sagnac residual phase. As a result, the controllable phase becomes an estimate of the Sagnac residual phase. The presence of the fringe visibility effect results in the estimate of the Sagnac residual phase being offset by $\epsilon$ from the Sagnac residual phase.

A second control loop, in the absence of the fringe visibility effect, maintains the light phase change commanded of the interferometer phase modulator equal to the phase change produced by the phase modulator. The presence of the fringe visibility effect results in the phase change produced by the phase modulator being greater than the phase change commanded by the factor $(1+\delta/\pi)$.

The third control loop, in the absence of the fringe visibility effect, maintains the average value of the high-pass filtered output signal from detector 6 at zero. The bias $$l\frac{I_0}{2}\sin\phi_M$$

is a result of the offset introduced by the analog-to-digital converter 8.

Each of the control loops involves a demodulation process which results in a demodulation signal. There are three such demodulation signals: DMOD1 associated with the first control loop; DMOD2 associated with the second control loop; and DMOD3 associated with the third control loop. The control parameters $\epsilon$, $\delta$, and l are adjusted by the control loops to null out the demodulation signals DMOD1, DMOD2, and DMOD3 simultaneously. In the absence of the fringe visibility effect, the three control parameters $\epsilon$, $\delta$, and l are sufficient to null out the three demodulation signals because of the symmetry of the interferometer cosine function. However, due to the asymmetries introduced for all but the zeroth fringe by the fringe visibility effect, the three control parameters are not sufficient, in the presence of the fringe visibility effect, to simultaneously null out the signals in all four modulation states on higher fringes eaten though the statistical averages of DMOD1, DMOD2, and DMOD3 can still be driven to zero. This effect can be used to determine the actual fringe number of operation. An additional demodulation signal DMOD4 is used to measure the left-over signals in the interferometer output and this value is processed to determine the fringe number.

The equations for four demodulation signals DMOD1, DMOD2, DMOD3, and DMOD4 are shown below for the three zones. The first three demodulation signals follow from equations (8), (9), and (10). The fourth demodulation signal DMOD4 provides the means for determining the fringe number n.

Zone 1
$$\begin{aligned} DMOD1 &= aA_n - bB_n + cC_n - dD_n \\ DMOD2 &= aA_n - bB_n - cC_n + dD_n \\ DMOD3 &= aA_n + bB_n + cC_n + dD_n \\ DMOD4 &= aA_n + bB_n - cC_n - dD_n \end{aligned} \quad (22)$$

Zone 2
$$\begin{aligned} DMOD1 &= -bB_n + cC_n - dD_n + eE_n \\ DMOD2 &= -bB_n + cC_n + dD_n - eE_n \\ DMOD3 &= bB_n + cC_n + dD_n + eE_n \\ DMOD4 &= -bB_n - cC_n + dD_n + eE_n \end{aligned} \quad (23)$$

Zone 3
$$\begin{aligned} DMOD1 &= -zZ_n + aA_n - bB_n + cC_n \\ DMOD2 &= -zZ_n + aA_n + bB_n - cC_n \\ DMOD3 &= zZ_n + aA_n + bB_n + cC_n \\ DMOD4 &= -zZ_n - aA_n + bB_n + cC_n \end{aligned} \quad (24)$$

The symbols z, a, b, c, d, and e stand for the probabilities of occurrence of modulation states Z, A, B, C, D, and E respectively. The probabilities can be determined by counting the occurrences of each state over a period of time.

The fringe number n is determined in the following way. The zone number is determined from $\phi_{SE}$, which is very nearly equal to $\phi_S$. Given the zone number, one of the equation sets (22), (23), and (24) is selected. The quantities DMOD1, DMOD2, and DMOD3, which are maintained at zero by the control loops, are set equal to zero and the equations in which they appear are, solved for $\epsilon(n)$, $\delta(n)$, and $l(n)$ for a specified set of n values by using standard numerical inversion methods for systems of linear equations. Typically, the set of n values will be limited to a small number. For example, given a fiber-optic gyro with a Sagnac scale factor (i.e. ratio of the phase difference between the counter propagating light beams to the rotation rate of the fiber-optic gyro) of 3.5 μrad/(deg/hr) and a rate range of ±1000 deg/s, the possible fringe numbers are −2, −1, 0, 1, and 2. The value of DMOD4(n) is then computed using the values for $\epsilon(n)$, $\delta(n)$, and $l(n)$, substituting in the appropriate DMOD4 equation in equation sets (22), (23), and (24) using the particular values defined in equation (21). The value of DMOD4 is measured and compared with computed values of DMOD4(n). The n value corresponding to the DMOD4(n) that is closest to the measured value of DMOD4 is determined to be the fringe number.

This procedure can also be used on a continuous basis for self-test purposes to make sure that the interferometer did not "jump" fringes as a result of an error or transient.

Alternatively, it is possible to determine analytic forms for the predicted DMOD4 as a function of n and avoid the matrix inversions necessary to solve the simultaneous equations. For example, in zone 1 for a modulation depth of 0.875, the analytic solution for DMOD4(n) is $$DMOD4(n) = Sn \left\{ \frac{1}{16} \frac{\frac{\phi_{se}}{\pi}}{\left(\frac{63}{64}\right) - \left(\frac{\phi_{se}}{\pi}\right)^2} - \left[\left(\frac{63}{64}\right) - \left(\frac{\phi_{se}}{\pi}\right)^2\right] \right\} \quad (25)$$

Where $\phi_{SE}$ is the Sagnac residual phase estimate which can be extracted from the first control loop initialized to the zeroth fringe.

What is claimed is:

1. A method for determining the fringe number for a fiber-optic gyro, the fiber-optic gyro comprising a light source feeding an interferometer wherein two light beams propagate in opposite directions, the interferometer feeding a detector, the detector output signal being a function of the fringe number and a plurality of controllable parameters, the method comprising the steps:

(a) determining the values of the controllable parameters;

(b) extracting the fringe number from the detector output signal utilizing the fringe visibility effect and the values of the controllable parameters, the detector output signal in the absence of the fringe visibility effect being proportional to (1+cos θ) where θ is the difference in phase of the two light beams, the fringe visibility effect being manifested by the cos θ term in the expression (1+cos θ) being multiplied by a power series in θ squared.

2. The method of claim 1 wherein step (a) comprises the steps:

(a1) transforming the detector output signal into a plurality of demodulation signals;

(a2) determining the values of the controllable parameters for which each of the plurality of demodulation signals has a predetermined value.

3. The method of claim 1 wherein step (b) comprises the steps:

(b1) transforming the detector output signal into a demodulation signal;

(b2) determining the measured value of the demodulation signal for the values of the controllable parameters.

4. The method of claim 1 wherein step (b) comprises the steps:

(b1) transforming the detector output signal into a demodulation signal;

(b2) determining the calculated value of a mathematical representation of the demodulation signal for each of a plurality of trial fringe numbers using the values of the controllable parameters.

5. The method of claim 1 wherein step (b) comprises the steps:

(b1) transforming the detector output signal into a demodulation signal;

(b2) determining the measured value of the demodulation signal for the values of the controllable parameters;

(b3) determining the calculated value of a mathematical representation of the demodulation signal for each of a plurality of trial fringe numbers using the values of the controllable parameters.

6. The method of claim 5 wherein step (b) comprises the step:

(b4) determining the fringe number by comparing the measured value of the demodulation signal with the calculated values of the mathematical representation of the demodulation signal.

7. The method of claim 1 wherein the detector output signal $F_{nkj}$ is a function of n, k, and j, the fringe number being denoted by n, the index k taking on the values −1, 0, and +1, the index j taking on the values −1 and +1, an index pair (k,j) denoting a state in which the fiber-optic gyro operates, a zone of operation for the fiber-optic gyro being associated with a plurality of states (k,j), $F_{nkj}$ also being a function of three controllable parameters $\epsilon$, $\delta$, and l, step (a) comprising the following steps:

(a1) determining the zone of operation;

(a2) causing each demodulation signal DMODp= $\Sigma P_{kj} C_{pkj} F_{nkj}$ to equal a predetermined value $A_p$, p taking on the values 1, 2, and 3, $P_{kj}$ being the probability of occurrence of state (k,j), $C_{pkj}$ being numerical coefficients, the summation being over the states associated with the zone in which the fiberoptic gyro is operating;

(a3) obtaining values of $\epsilon$, $\delta$, and l by solving the equations $\Sigma P_{kj} C_{pkj} F_{nkj} = A_p$ for p equal to 1, 2, and 3 utilizing measured values for $F_{nkj}$, the summation being over the states associated with the zone of operation.

8. The method of claim 1 wherein the detector output signal $F_{nkj}$ is a function of n, k, and j, the fringe number being denoted by n, the index k taking on the values –1, 0, and +1, the index j taking on the values –1 and +1, an index pair (k,j) denoting a state in which the fiber-optic gyro operates, a zone of operation for the fiber-optic gyro being associated with a plurality of states (k,j), $F_{nkj}$ also being a function of three controllable parameters $\epsilon$, $\delta$, and l, step (b) comprising the following steps:

(b1) determining the zone of operation;

(b2) obtaining a measured value for demodulation signal DMOD4=$\Sigma P_{kj} C_{4kj} F_{nkj}$ utilizing measured values for $F_{nkj}$, $P_{kj}$ being the probability of occurrence of state (k,j), $C_{4kj}$ being numerical coefficients.

9. The method of claim 1 wherein the detector output signal $F_{nkj}$ is a function of n, k, and j, the fringe number being denoted by n, the index k taking on the values –1, 0, and +1, the index j taking on the values –1 and +1, an index pair (k,j) denoting a state in which the fiber-optic gyro operates, a zone of operation for the fiber-optic gyro being associated with a plurality of states (k,j), $F_{nkj}$ also being a function of three controllable parameters $\epsilon$, $\delta$, and l, step (b) comprising the following steps:

(b1) determining the zone of operation;

(b2) obtaining calculated values for demodulation signal DMOD4=$\Sigma P_{kj} C_{4kj} F_{nkj}$ for each of a plurality of trial values of n utilizing calculated values for $F_{nkj}$, $P_{kj}$ being the probability of occurrence of state (k,j), $C_{4kj}$ being numerical coefficients.

10. The method of claim 1 wherein the detector output signal $F_{nkj}$ is a function of n, k, and j, the fringe number being denoted by n, the index k taking on the values –1, 0, and +1, the index j taking on the values –1 and +1, an index pair (k,j) denoting a state in which the fiber-optic gyro operates, a zone of operation for the fiber-optic gyro being associated with a plurality of states (k,j), $F_{nkj}$ also being a function of three controllable parameters $\epsilon$, $\delta$, and l, step (a) comprising the following steps:

(b1) determining the zone of operation;

(b2) obtaining a measured value for demodulation signal DMOD4=$\Sigma P_{kj} C_{4kj} F_{nkj}$ utilizing measured values for $F_{nkj}$, $P_{kj}$ being the probability of occurrence of state (k,j), $C_{4kj}$ being numerical coefficients.

(b3) obtaining calculated values for demodulation signal DMOD4=$\Sigma P_{kj} C_{4kj} F_{nkj}$ for each of a plurality of trial values of n utilizing calculated values for $F_{nkj}$.

11. The method of claim 10 wherein step (b) comprising the following step:

(b4) identifying the trial value of n associated with the calculated value of the demodulation signal DMOD4 that is closest to the measured value of the demodulation signal DMOD4, the identified trial value of n being the fringe number.

12. An apparatus for determining the fringe number for a fiber-optic gyro, the fiber-optic gyro comprising a light source feeding an interferometer wherein two light beams propagate in opposite directions, the interferometer feeding a detector, the detector output signal being a function of the fringe number and a plurality of controllable parameters, the apparatus comprising:

(a) a means for determining the values of the controllable parameters;

(b) a means for extracting the fringe number from the detector output signal utilizing the fringe visibility effect and the values of the controllable parameters, the detector output signal in the absence of the fringe visibility effect being proportional to (1+cos θ) where θ is the difference in phase of the two light beams, the fringe visibility effect being manifested by the cos θ term in the expression (1+cos θ) being multiplied by a power series in θ squared.

13. The apparatus of claim 12 wherein means (a) comprises:

(a1) a plurality of demodulators that transform the detector output signal into a plurality of demodulation signals;

(a2) a plurality of control loops that force each of the plurality of demodulation signals to have a predetermined value by adjusting the values of the controllable parameters;

(a3) a processor that utilizes the predetermined values of the plurality of demodulation signals to obtain values for the controllable parameters.

14. The apparatus of claim 12 wherein means (b) comprises:

(b1) a demodulator that transforms the detector output signal into a demodulation signal;

(b2) a memory wherein the measured value of the demodulation signal is stored.

15. The apparatus of claim 12 wherein means (b) comprises:

(b1) a demodulator that transforms the detector output signal into a demodulation signal;

(b2) a processor that determines the calculated values of a mathematical representation of the demodulation signal for each of a plurality of trial fringe numbers using the values of the controllable parameters.

16. The apparatus of claim 12 wherein means (b) comprises:

(b1) a demodulator that transforms the detector output signal into a demodulation signal;

(b2) a memory wherein the measured value of the demodulation signal is stored;

(b3) a processor that determines the calculated values of a mathematical representation of the demodulation signal for each of a plurality of trial fringe numbers using the values of the controllable parameters.

17. The apparatus of claim 16 wherein means (b) comprises:

(b4) a processor that equates the fringe number to the trial fringe number associated with the calculated value of the mathematical representation of the demodulation signal that is closest to the measured value of the demodulation signal.

18. The apparatus of claim 12 wherein the detector output signal $F_{nkj}$ is a function of n, k, and j, the fringe number being denoted by n, the index k taking on the values –1, 0, and +1, the index j taking on the values –1 and +1, an index pair (k,j) denoting a state in which the fiber-optic gyro operates, a zone of operation for the fiber-optic gyro being associated with a plurality of states (k,j), $F_{nkj}$ also being a function of three controllable parameters $\epsilon$, $\delta$, and l, means (a) comprising:

(a1) a plurality of demodulators that transform the detector output signal into a plurality of demodulation signals DMODp, p taking on the values 1, 2, and 3;

(a2) a plurality of control loops that force each of the plurality of demodulation signals DMODp to have a predetermined value $A_p$ by adjusting the values of the controllable parameters.

19. The apparatus of claim 12 wherein the detector output signal $F_{nkj}$ is a function of n, k, and j, the fringe number being denoted by n, the index k taking on the values −1, 0, and +1, the index j taking on the values −1 and +1, an index pair (k,j) denoting a state in which the fiber-optic gyro operates, a zone of operation for the fiber-optic gyro being associated with a plurality of states (k,j), $F_{nkj}$ also being a function of three controllable parameters $\epsilon$, $\delta$, and l, means (a) comprising:

(a1) a processor that determines the zone of operation;

(a2) a processor that obtains values of $\epsilon$, $\delta$, and l by solving the equations $\Sigma P_{kj} C_{pkj} F_{nkj} = A_p$ for p equal to 1, 2, and 3 utilizing measured values for $F_{nkj}$, the quantities $A_p$ being predetermined constants, $P_{kj}$ being the probability of occurrence of state (k,j), $C_{pkj}$ being numerical coefficients, the summation being over the states associated with the zone in which the fiber-optic gyro is operating.

20. The apparatus of claim 12 wherein the detector output signal $F_{nkj}$ is a function of n, k, and j, the fringe number being denoted by n, the index k taking on the values −1, 0, and +1, the index j taking on the values −1 and +1, an index pair (k,j) denoting a state in which the fiber-optic gyro operates, a zone of operation for the fiber-optic gyro being associated with a plurality of states (k,j), $F_{nkj}$ also being a function of three controllable parameters $\epsilon$, $\delta$, and l, means (b) comprising:

(b1) a demodulator that transforms the detector output signal into a demodulation signal DMOD4;

(b2) a memory wherein the measured value of DMOD4 is stored.

21. The apparatus of claim 12 wherein the detector output signal $F_{nkj}$ is a function of n, k, and j, the fringe number being denoted by n, the index k taking on the values −1, 0, and +1, the index j taking on the values −1 and +1, an index pair (k,j) denoting a state in which the fiber-optic gyro operates, a zone of operation for the fiber-optic gyro being associated with a plurality of states (k,j), $F_{nkj}$ also being a function of three controllable parameters $\epsilon$, $\delta$, and l, step (b) comprising:

(b1) a processor that determines the zone of operation;

(b2) a processor that obtains calculated values for demodulation signal $DMOD4 = \Sigma P_{kj} C_{4kj} F_{nkj}$ for each of a plurality of trial values of n utilizing calculated values for $F_{nkj}$, $P_{kj}$ being the probability of occurrence of state (k,j), $C_{4kj}$ being numerical coefficients.

22. The apparatus of claim 12 wherein the detector output signal $F_{nkj}$ is a function of n, k, and j, the fringe number being denoted by n, the index k taking on the values −1, 0, and +1, the index j taking on the values −1 and +1, an index pair (k,j) denoting a state in which the fiber-optic gyro operates, a zone of operation for the fiber-optic gyro being associated with a plurality of states (k,j), $F_{nkj}$ also being a function of three controllable parameters $\epsilon$, $\delta$, and l, step (a) comprising the following steps:

(b1) a demodulator that transforms the detector output signal into a demodulation signal DMOD4;

(b2) a memory wherein the measured value of DMOD4 is stored;

(b3) a processor that determines the zone of operation;

(b4) a processor that obtains calculated values for demodulation signal $DMOD4 = \Sigma P_k C_{4kj} F_{nkj}$ for each of a plurality of trial values of n utilizing calculated values for $F_{nkj}$, $P_{kj}$ being the probability of occurrence of state (k,j), $C_{4kj}$ being numerical coefficients.

23. The apparatus of claim 22 wherein step (b) comprising the following step:

(b5) a processor that identifies the trial value of n associated with the calculated value of the demodulation signal DMOD4 that is closest to the measured value of the demodulation signal DMOD4, the identified trial value of n being the fringe number.

* * * * *